(12) United States Patent
Malandra et al.

(10) Patent No.: US 9,233,044 B2
(45) Date of Patent: Jan. 12, 2016

(54) METHOD OF MAKING COFFINS, SARCOPHAGI, CINERARY URNS AND THE LIKE

(71) Applicant: Anima Design S.r.l., Poncarale (IT)

(72) Inventors: Gianluca Malandra, Bovezzo (IT); Maria Daniela Malandra, Bovezzo (IT)

(73) Assignee: Anima Design S.r.l., Poncarale, Brescia (IT)

( * ) Notice: Subject to any disclaimer, the term of this patent is extended or adjusted under 35 U.S.C. 154(b) by 0 days.

(21) Appl. No.: 14/585,701

(22) Filed: Dec. 30, 2014

(65) Prior Publication Data

US 2015/0209210 A1   Jul. 30, 2015

Related U.S. Application Data

(62) Division of application No. 13/057,067, filed as application No. PCT/IT2009/000345 on Jul. 30, 2009, now abandoned.

(51) Int. Cl.
| | |
|---|---|
| *A61G 17/007* | (2006.01) |
| *A61G 17/02* | (2006.01) |
| *A61G 17/04* | (2006.01) |
| *B32B 37/12* | (2006.01) |
| *B32B 37/18* | (2006.01) |
| *B32B 38/10* | (2006.01) |
| *A61G 17/00* | (2006.01) |

(52) U.S. Cl.
CPC .............. *A61G 17/007* (2013.01); *A61G 17/02* (2013.01); *A61G 17/04* (2013.01); *B32B 37/1284* (2013.01); *B32B 37/182* (2013.01); *B32B 38/10* (2013.01); *A61G 2017/004* (2013.01); *B32B 2317/16* (2013.01); *B32B 2439/40* (2013.01); *B32B 2451/00* (2013.01); *Y10T 428/28* (2015.01); *Y10T 428/2835* (2015.01)

(58) Field of Classification Search
CPC ........... A61G 2017/004; A61G 17/007; A61G 17/0073; A61G 17/02; A61G 17/04; A61G 2017/042; Y10T 428/28; Y10T 428/2835; Y10T 428/1486; Y10T 428/1495; C09D 5/008; B29C 63/0013; G09F 3/04; G09F 3/10; B32B 37/1284; B32B 37/182; B32B 38/10; B32B 2317/16; B32B 2439/40; B32B 2451/00
USPC ............ 27/2–5, 19; 428/343, 351, 42.1, 42.3; 427/154; 156/247
See application file for complete search history.

(56) References Cited

U.S. PATENT DOCUMENTS

| | | |
|---|---|---|
| 246,241 A | 8/1881 | Taylor |
| 1,388,426 A | 8/1921 | Greive |
| 2,030,558 A | 2/1936 | White |
| 2,231,995 A | 2/1941 | Glidden |
| 2,249,283 A | 7/1941 | Brady et al. |
| 3,103,053 A | 9/1963 | Nelson |

(Continued)

FOREIGN PATENT DOCUMENTS

JP   2010264091   11/2010

*Primary Examiner* — William Miller
(74) *Attorney, Agent, or Firm* — Davis & Bujold, P.L.L.C.; Michael J. Bujold

(57) ABSTRACT

A coffin made of a wood material, rather than being painted or finished, is temporarily covered with an attractive removable film for display purposes. The film is removed and recycled before the coffin is cremated or buried. This minimizes environmental contamination during both construction of the coffin and its disposal.

12 Claims, 4 Drawing Sheets

(56) References Cited

U.S. PATENT DOCUMENTS

| | | |
|---|---|---|
| 4,730,370 A | 3/1988 | Elder |
| 5,301,398 A | 4/1994 | Bursey, Jr. |
| 5,377,395 A | 1/1995 | Maier |
| 5,570,493 A | 11/1996 | Gulick |
| 5,887,321 A | 3/1999 | Foley |
| 6,065,193 A | 5/2000 | Foley |
| 6,223,404 B1 | 5/2001 | Fant |
| 6,314,626 B1 | 11/2001 | Becker |
| 6,716,487 B1 | 4/2004 | Song |
| 7,222,400 B2 | 5/2007 | Leverett |
| 7,434,298 B2 | 10/2008 | De La Fuente |
| 2013/0125357 A1 | 5/2013 | Drew |
| 2014/0000134 A1* | 1/2014 | Cox et al. .................... 40/124.5 |

* cited by examiner

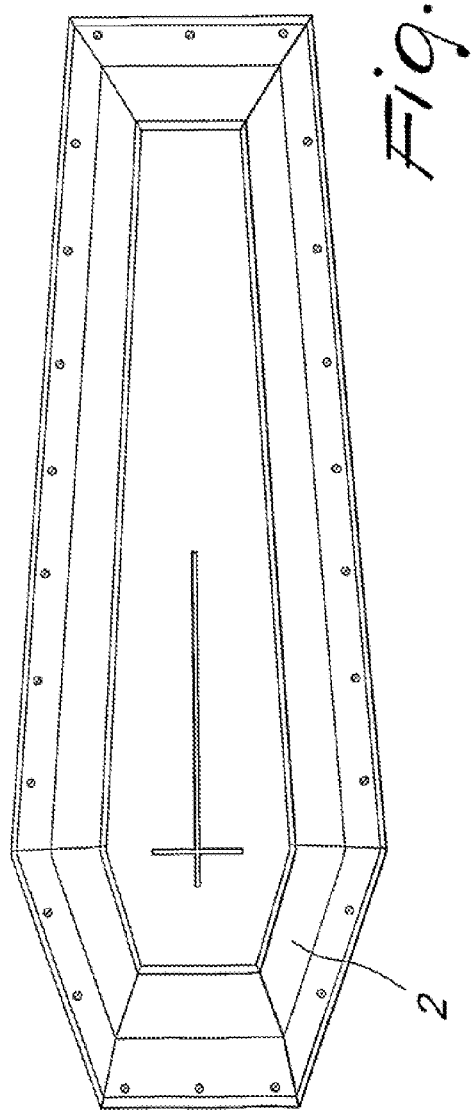
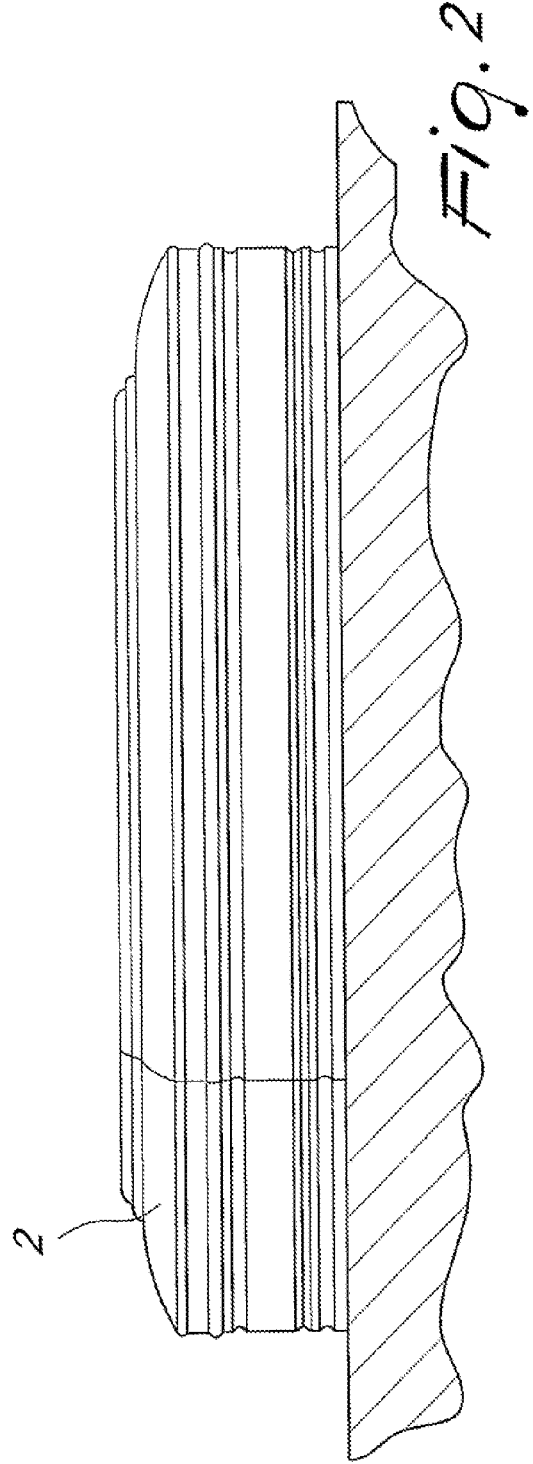
Fig. 1
Fig. 2

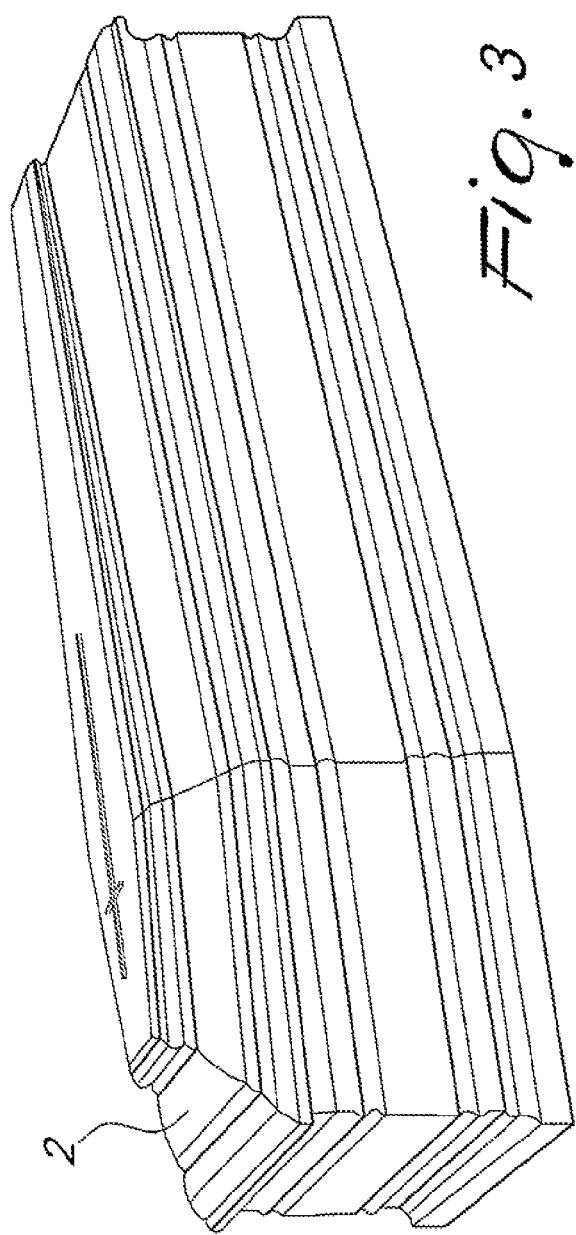
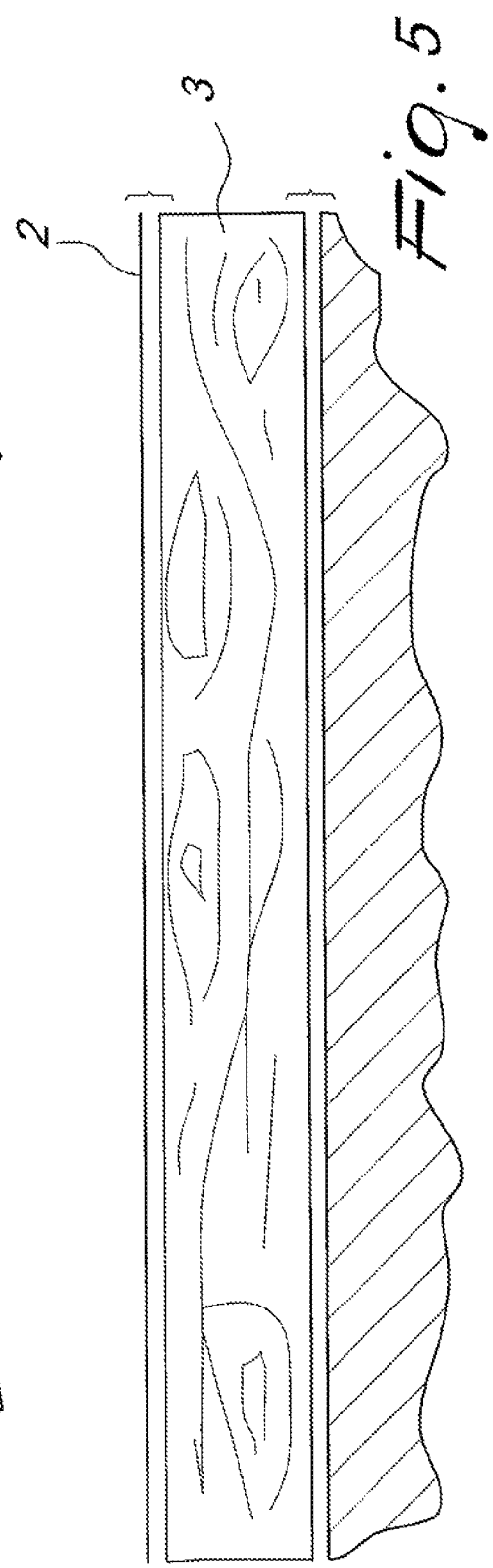

METHOD OF MAKING COFFINS, SARCOPHAGI, CINERARY URNS AND THE LIKE

This application is a division of copending application Ser. No. 13/057,067, filed Feb. 1, 2011, which was the national phase of international application PCT/IT2009/000345 and claimed priority from Italian Utility Model Applns. BS2008U000025 and BS2009U000006, the disclosures of which are incorporated herein by reference.

BACKGROUND OF THE INVENTION

The present invention relates to a method of making coffins, sarcophagi, cinerary urns and the like. The word "coffin" herein includes all such containers.

In the field of undertaking and the like, known types of coffin currently used are generally made of wood and subsequently painted for decoration according to the requirements of the person who orders the coffin.

These painted coffins are not free from drawbacks, which include the fact that the paints used are toxic both for the environment and for the painting workers who use them during the process for painting said coffin.

This toxicity is further observed in the areas neighboring the factory where the coffins are manufactured.

The competent local health services in fact detect a high rate of pollution and toxicity related to the emissions of vapors released by the paints of coffins.

For example, considering an annual productivity, in the Italian market alone, of 550,000 coffins per year, and considering an average consumption of 4 kilograms of paint to paint a single coffin, there is a total consumption of 2,200,000 kilograms of highly toxic substances which are dispersed into the environment, into the atmosphere or into the ground, depending on whether the coffin is cremated or buried.

If the coffin is buried or placed in a loculus, it is not disposed of but remains toxic and harmful for a period of time that currently, by law, in Italy is equal to ten years.

Once this period of time has elapsed, the coffins are exhumed and are disposed of with difficulty, very often by means of a process that does not safeguard the environment.

Coffins designed for cremation, are burned in crematoriums, thus emitting toxic fumes into the atmosphere caused by the burning of the paints with which they are painted, thus contributing to pollution.

Another drawback of known types of coffin consists in that continuous use of wood to build them contributes to global exploitation of the environment and of nature, reducing ever more the number of particularly valuable trees, such as for example larch and durmast oak.

In addition to the consumption of wood used directly to provide the coffin, one must consider the fact that a large amount of wood is rejected or otherwise not used due to the presence of surface defects that are not appreciated by consumers, such as for example knots and imperfections caused by the grain.

SUMMARY OF THE INVENTION

The aim of the present invention is to provide an external covering for coffins, sarcophagi and the like that solves the problems of the background art.

Within this aim, an object of the present invention is to provide an external covering for coffins that makes it possible to eliminate totally or partially the painting of the coffin.

Another object of the present invention is to provide an external covering for coffins that makes it possible to use, in order to provide the coffin, even wood that is normally considered second choice and therefore not usable.

Another object of the present invention is to reduce drastically the processes for preparing the wood used to prepare coffins, such as planing and sanding with various grains and passes.

Another object of the present invention is to make the coffin entirely suitable for cremation. This aim, these objects and others that will become better apparent hereinafter are achieved by an external covering for coffins, sarcophagi and the like, characterized in that it comprises at least one adhesive film that can be applied uniformly over the entire outer surface of a coffin and the like.

BRIEF DESCRIPTION OF DRAWINGS

Further characteristics and advantages of the present invention will become apparent from the description of a preferred but not exclusive embodiment, of an external covering for coffins, sarcophagi and the like according to the invention, illustrated by way of non-limiting example in the accompanying drawings, wherein:

FIG. 1 is a plan view of a coffin constructed according to the invention;

FIG. 2 is a lateral elevation view of the coffin shown in FIG. 1;

FIG. 3 is a perspective view of the coffin shown in FIG. 1;

FIG. 5 is a sectional view of part of the coffin shown in FIG. 1;

DETAILED DESCRIPTION OF THE INVENTION

Figures 4A, 4B, 4C:
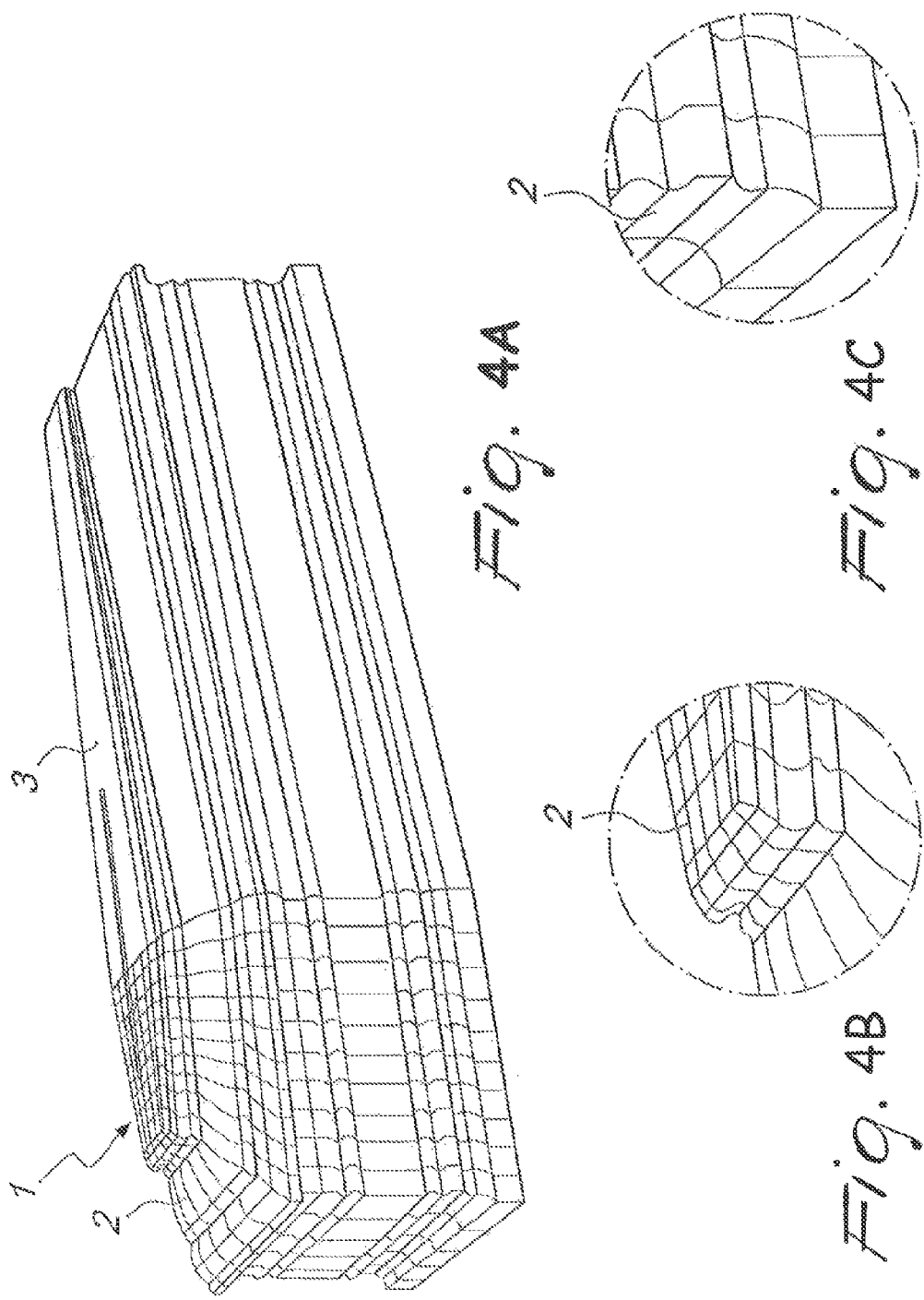
FIG. 4A is a perspective view of the coffin shown in FIG. 1.
FIG. 4B is an enlargement of a top section of the coffin and FIG. 4C is an enlargement of a corner section of the coffin.
Figure 6:
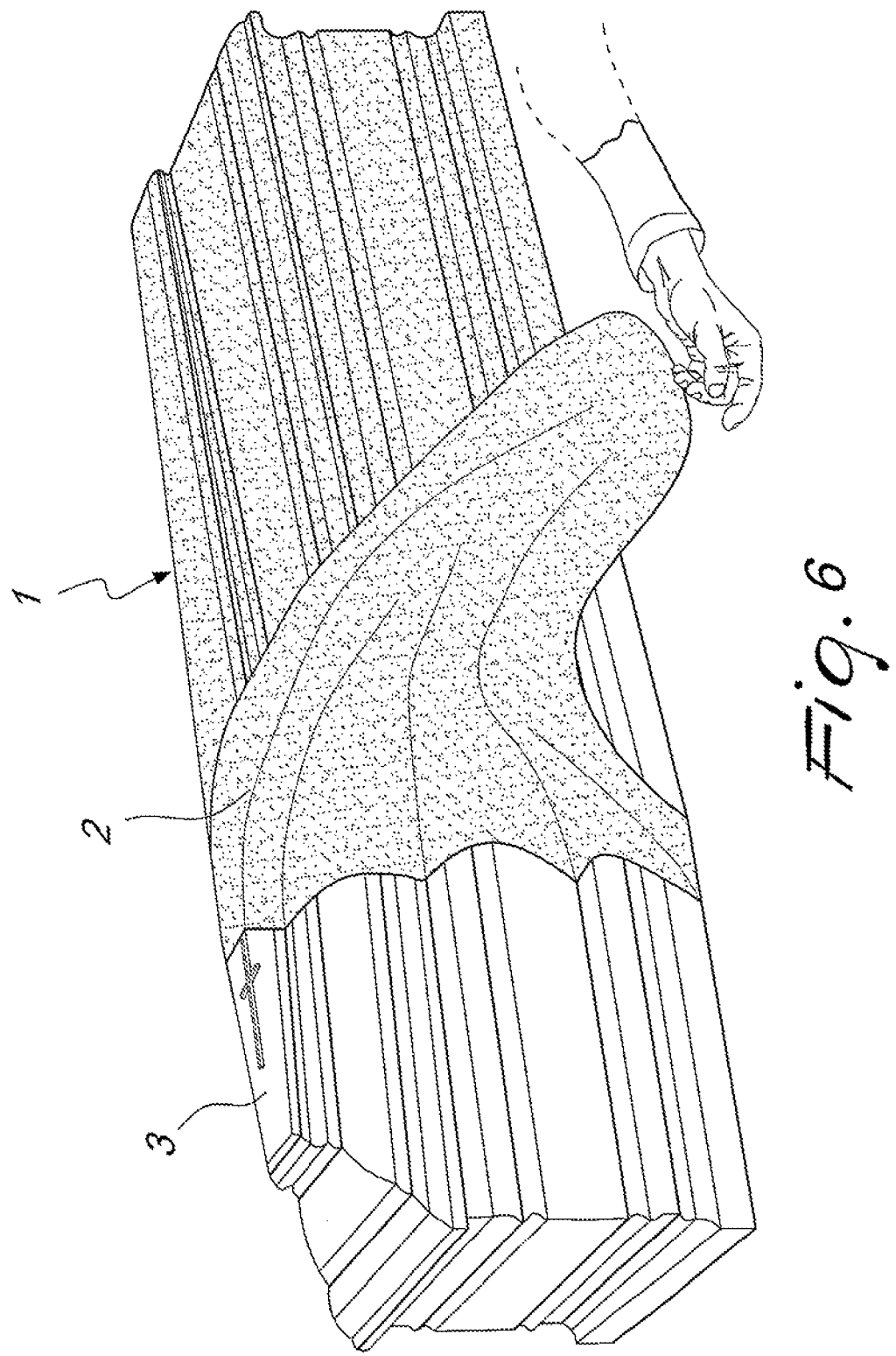
FIG. 6 is a perspective view of the coffin shown in FIG. 1 during the step for removal of the outer covering.

With reference to the figures, according to the invention, the external covering for coffins, sarcophagi and the like, generally designated by the reference numeral 1, comprises at least one adhesive film 2, which can be applied uniformly to the entire outer surface of a coffin 3 and the like even on particularly complex surfaces, such as for example in the presence of edges, moldings and other geometric shapes.

More precisely, the adhesive film 2 can be applied to the surfaces of the coffin 3 by way of the adhesive layer that is present on one side thereof.

As described in greater detail hereinafter, the adhesive layer of the adhesive film 2 is such as to allow the operator of the crematorium to easily remove the adhesive film 2 from the coffin 3 before cremating it, so as to allow the recycling of the material of which the adhesive film 2 is made.

Advantageously, said adhesive film 2, which in two mutually alternative possible variations is made of plastic material or environmentally friendly paper, is made of a recyclable material.

Conveniently, the adhesive film can be made for example of polypropylene, homopolymer, copolymer, polystyrene, polyethylene, ethylene, polyvinyl chloride, polymethyl methacrylate, styrene acrylonitrile, or any other similar material.

In order to withstand the effects of weather to which the coffin 3 is subjected during its use and otherwise, the adhesive film 2, which can bear decorations of various kinds depending on the preferences of the buyer, such as for example fantastic, naturalistic, military, abstract, religious, artistic, photographic decorations, with or without lettering, can be waterproof, light-tight and resistant to wind and heat.

The decorations can be provided by using plant- and animal-derived dyes which are edible and therefore not harmful and adhesives that are likewise plant- and/or animal-derived.

Finally, the adhesive film 2 can be monochrome or multicolored, smooth or rough, glossy or opaque, breathable or conspicuous.

The film is applied by laying it on the various parts of the coffin or the like, eliminating the excess parts with a cutter. By using a source of hot air, some parts of the film are heated in order to make it adhere better and therefore align with edges and corners of any geometric shape that are present on the coffin. Any bubbles can be eliminated with the aid of appropriately provided spatulas.

The adhesive film 2 can be a thermoadhesive, heat-shrink film, which can be applied to the coffin with the "vacuum" technique.

In practice it has been found that the external covering for coffins, sarcophagi and the like according to the present invention fully achieves the intended aim and objects, since it makes it possible to cover completely and uniformly coffins or sarcophagi by using one or more adhesive films, which can also be drawn with a pantograph or generated with a plotter (this expression refers to cuts for pre-spaced techniques etcetera). Essentially, if the coffin is indeed covered with the film described above, it is possible to apply patterns and ornaments over said film without them having the same quality.

More precisely, this adhesive covering fully or partially replaces the paint with which coffins are commonly painted, and other than said paint hides any defects or flaws of the wood with which the coffin is made, making it assume a pleasant appearance even if it is made with rough wood or reclaimed wood, such as for example boards or pieces of solid wood of low quality, with knots and imperfections caused by visible grain, laminated wood, chipwood, plywood, or cellulose-derived materials.

In this manner it is possible to protect nature against the exploitation of trees and against atmospheric pollution.

Another advantage of the covering according to the present invention is that since the adhesive film is decorated by means of a printing process, it is possible to represent thereon the grain of a quality wood, improving the aesthetics of the coffin to which it is applied and refining it, even though the coffin is made of a material that in itself is of low value.

Another advantage of the covering according to the present invention is that the removed adhesive films are not thrown away but can be recognized as 100% fully recyclable material.

Accordingly, at the sites of crematoriums, prior to the cremation procedure, it is possible to remove and recover the adhesive films, keeping only the rough 100% wood coffin, which does not cause pollution.

The covering according to the invention can conveniently comprise a certification element that is associated with one of the two surfaces of the covering or is inserted therein such as a watermark, hologram or reflector and the like. The certification element attests that the film used as a covering does not leave residues. Recognition of this particularity is a check that must be performed by the operator who presently, prior to cremation, removes the brass parts (crosses, handles, etcetera) from coffins before introducing them in the cremation oven.

Another advantage of the covering according to the present invention consists in being economically advantageous with respect to what is provided in the background art, since there is a saving that is equal to the cost of the paints, to the cost of the application of the paint, to the cost of disposal of the pollutants contained in the paints, to any penalties due to an excess of harmful substances introduced in the environment, and to the difference in cost between inexpensive wood and valuable wood.

Furthermore, all the details may be replaced with other technically equivalent elements.

In practice, the materials used, as long as they are compatible with the specific use, as well as the contingent shapes and dimensions, may be any according to requirements and to the state of the art.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. An environmentally responsible method of making and using a coffin, the method comprising steps of:
    constructing the coffin from an unfinished, uncoated wood material,
    completely covering an outer surface of the coffin with a removable adhesive film material, to give the coffin a finished appearance suitable for display,
    displaying the coffin at a funeral ceremony, and thereafter,
    removing the adhesive film material from the coffin,
    recycling the removed adhesive film material, and
    burying or cremating the unfinished, uncoated coffin.

2. The method of claim 1, wherein the adhesive film material is applied uniformly over an entire outer surface of the coffin.

3. The method of claim 1, wherein the adhesive film material is waterproof.

4. The method of claim 1, wherein the adhesive film material is impermeable to light.

5. The method of claim 1, wherein the adhesive film material is impermeable to air.

6. The method of claim 1, wherein the adhesive film material is made of plastic material.

7. The method of claim 1, wherein the adhesive film material comprises an environmentally friendly paper.

8. The method of claim 1, wherein the adhesive film material comprises edible dyes.

9. The method of claim 1, further comprising a step of applying a certification element on or within the adhesive film material.

10. The method of claim 1, wherein the adhesive film material is applied by laying the adhesive film material on various parts of the coffin and eliminating excess adhesive material with a cutter.

11. The method of claim 1, wherein at least part of the adhesive film material is heated with hot air, during the covering step, to improve adhesion and to conform the adhesive film material to the outer surface of the coffin.

12. The method of claim 1, wherein the adhesive film material is a thermoadhesive, heat-shrink film, and is applied to the outer surface of the coffin with a vacuum technique.

* * * * *